（12）United States Patent
Whelan et al.

(10) Patent No.: US 10,702,431 B1
(45) Date of Patent: Jul. 7, 2020

(54) KEYED AND INDEXED EMBOSSED TUBE AND TAPER LOCK SYSTEM

(71) Applicant: Ki Mobility, Stevens Point, WI (US)

(72) Inventors: Thomas J. Whelan, Stevens Point, WI (US); Alan Nicholas Ludovici, Stevens Point, WI (US)

(73) Assignee: Ki Mobility, Stevens Point, WI (US)

( * ) Notice: Subject to any disclaimer, the term of this patent is extended or adjusted under 35 U.S.C. 154(b) by 1042 days.

(21) Appl. No.: 15/054,056

(22) Filed: Feb. 25, 2016

(51) Int. Cl.
*A61G 5/10* (2006.01)
*F16B 7/14* (2006.01)

(52) U.S. Cl.
CPC ............ *A61G 5/1056* (2013.01); *F16B 7/149* (2013.01)

(58) Field of Classification Search
CPC .......... F16B 7/044; F16B 7/048; F16B 12/40; Y10T 403/32475; Y10T 403/32451; Y10T 403/32483; Y10T 403/592; Y10T 403/7182; Y10T 403/32524; Y10T 403/7188; Y10T 403/7194; A61G 5/1056; A61G 5/1064; A61G 5/1067; A61G 5/10; A61G 5/12; A61G 5/125; A61G 5/127; A61G 5/128; A61G 5/107
USPC ........................................................ 135/909
See application file for complete search history.

(56) References Cited

U.S. PATENT DOCUMENTS

| | | | | |
|---|---|---|---|---|
| 4,113,221 A * | 9/1978 | Wehner | ..................... | A47C 3/34 248/408 |
| 5,267,745 A * | 12/1993 | Robertson | ................ | A61G 5/00 280/250.1 |
| 5,590,893 A * | 1/1997 | Robinson | ................. | A61G 5/00 280/250.1 |
| 6,027,132 A * | 2/2000 | Robinson | ................. | A61G 5/00 16/19 |
| 6,126,186 A * | 10/2000 | Mascari | .............. | A61G 5/1075 280/220 |
| 6,247,717 B1 * | 6/2001 | Lovins | ..................... | A61G 5/10 280/250.1 |
| 6,832,784 B1 * | 12/2004 | Chen | ....................... | A47L 9/244 285/303 |
| 6,913,318 B2 * | 7/2005 | Higley | ................. | A61G 5/1067 297/383 |
| 7,520,518 B2 * | 4/2009 | Peterson | .................. | A61G 5/00 280/250.1 |
| 9,248,072 B2 * | 2/2016 | Wu | ......................... | A61H 3/04 |
| 9,358,164 B2 * | 6/2016 | Brenner | ................... | A61G 5/08 |
| 10,072,439 B2 * | 9/2018 | Lovley, II | .............. | E04H 15/34 |
| 2006/0087098 A1 * | 4/2006 | Peterson | ............ | B60B 33/0007 280/304.1 |

\* cited by examiner

*Primary Examiner* — Michael P Ferguson
(74) *Attorney, Agent, or Firm* — Thedford I. Hitaffer; Hitaffer & Hitaffer, PLLC

(57) ABSTRACT

A keyed and indexed tube and a taper lock system are suitable for use with a wheelchair, especially a pediatric wheelchair, which may require frequent adjustments during the growth of the occupant.

16 Claims, 7 Drawing Sheets

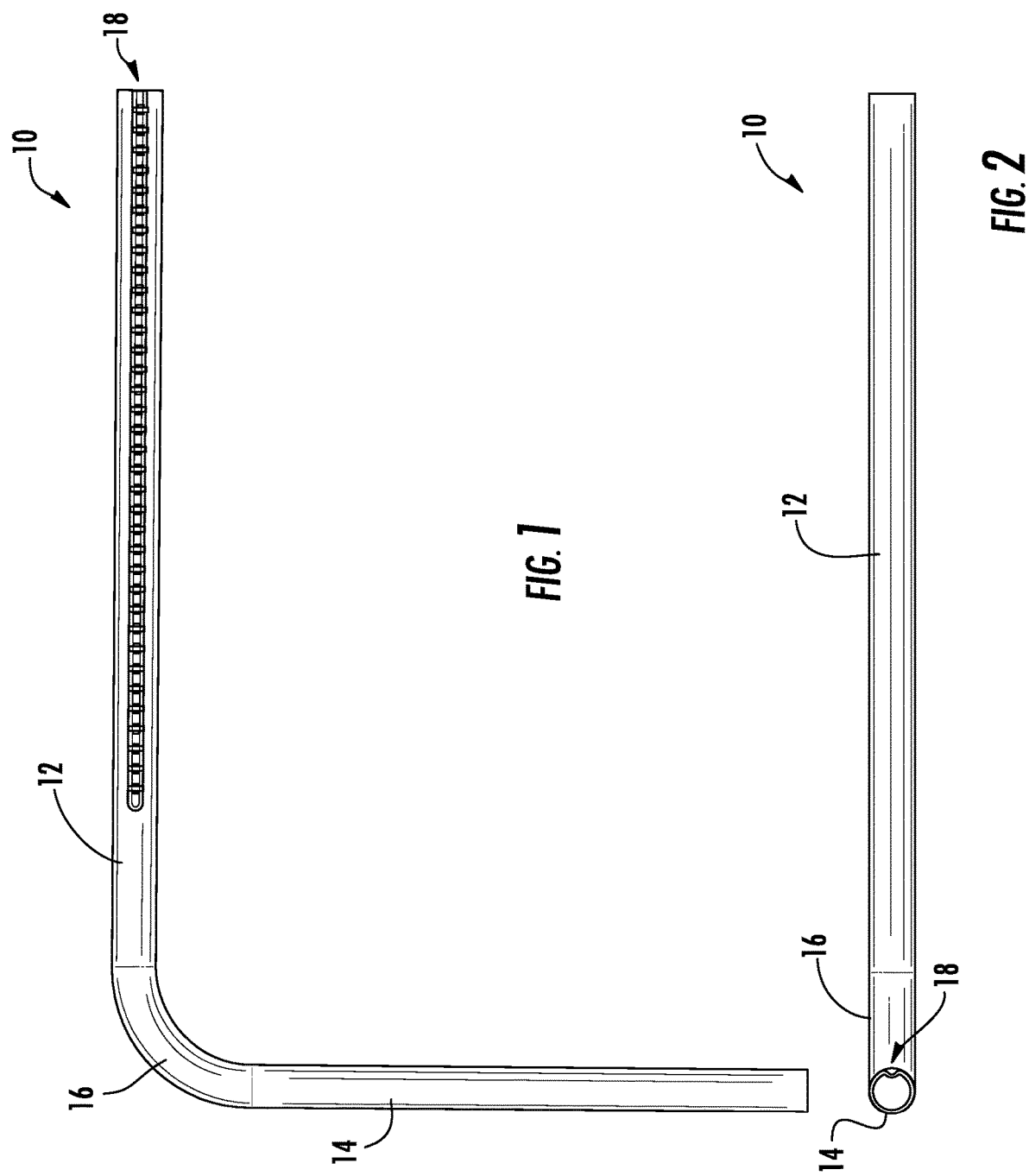

KEYED AND INDEXED EMBOSSED TUBE AND TAPER LOCK SYSTEM

BACKGROUND OF THE INVENTION

This invention relates in general to wheelchairs and more particularly, to wheelchair tubing and lock systems, and a method for making the same. The tubing and lock system are especially suitable for pediatric wheelchairs, where the growth of the occupant requires frequent adjustments in the wheelchair.

SUMMARY OF THE INVENTION

This invention relates to a keyed and indexed tube and a taper lock system suitable for use with a wheelchair, especially a pediatric wheelchair, which may require frequent adjustments during the growth of the occupant.

The tube may be comprised of a concave keyway and concave dimples within the keyway. The boundary of the keyway and the boundary of the opening of the dimples may be defined by a curved, rounded or soft corner so as to form a smooth transition to the keyway and the dimples. A coupling has a convex key and one or more plungers that respectively mate with the keyway and dimples in the tube. The tube is preferably formed in a multi-stage process, wherein the tube is first extruded, and then the keyway and the dimples are subsequently formed in one or more processes, such as by stamping, rolling or embossing the tube.

The taper lock system comprises a coupling that mates with a tube, such as a cross tube for a wheelchair. The tube has a flat upper surface and a flat end that may be at a right angle relative to one another. These flat surfaces mate or cooperate with two flat surfaces of the coupling. The coupling has a downwardly depending plate that defines one of the flat surfaces, which mates with the end of the tube. The downwardly depending plate has slots therethrough that align with threaded bores in the end of the tube. The plate is countersunk with a tapered surface, the center of which is offset from the center of the slots. As screws are tightened into the threaded bores, tapered heads of the screws cooperate with the tapered surfaces to urge the tube upward to tightly engage the flat upper surface of the tube with a flat bottom surface of the coupling. The cooperating tapered surfaces and tapered heads form a tapered lock that locks the coupling and the tube in two directions (i.e., horizontally and vertically) to produce a superior rigid connection between the coupling and the tube, with no play or movement between the parts. This also effectively eliminates the risk that the screws will become loose during the operation of the wheelchair.

Various advantages of this invention will become apparent to those skilled in the art from the following detailed description of the preferred embodiment, when read in light of the accompanying drawings.

BRIEF DESCRIPTION OF THE DRAWINGS

FIG. 1 is a side elevational view of an exemplary wheelchair side frame.

FIG. 2 is a bottom plan view of the side frame shown in FIG. 1.

DETAILED DESCRIPTION OF THE PREFERRED EMBODIMENT

Figure 3:
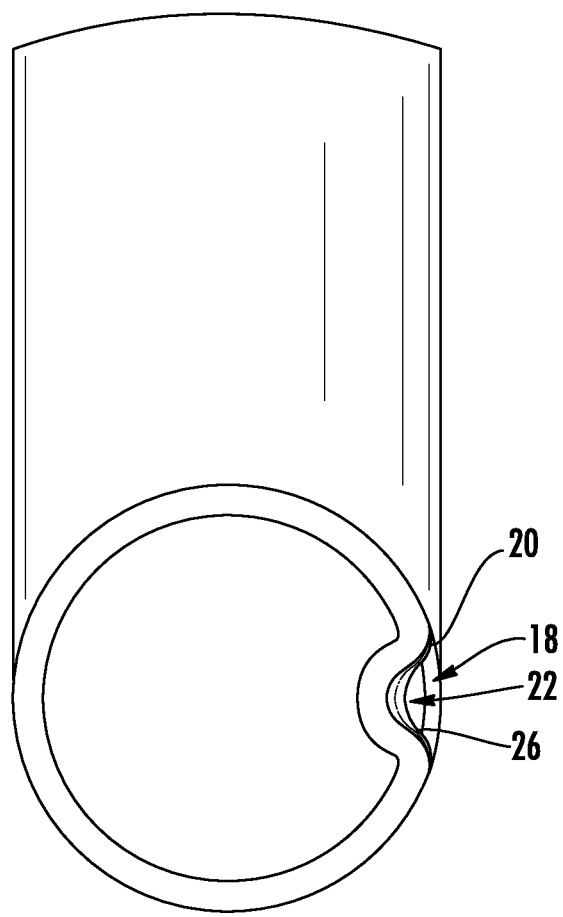
FIG. 3 is an enlarged sectional view of the side frame shown in FIG. 1.

Referring now to the drawings, there is illustrated in FIGS. 1 and 2 an exemplary wheelchair side frame 10. The side frame 10 includes a substantially horizontal side tube 12 and a substantially vertical front tube 14 joined to the side tube 12 by a corner tube 16. These tubes 12, 14 and 16 may be formed of a single tube that is bent at a right angle at the corner tube 16, or a plurality of tubes joined together in any suitable manner, as should be understood by one of ordinary skill in the art.

A single tube, or a plurality of tubes joined together, will hereinafter be referred to as a tube. The tube is preferably a substantially cylindrical tube, or standard round tube, although it may be of other suitable shapes. The tube is preferably extruded, although it may be formed in another suitable manner, as should be understood by one of ordinary skill in the art.

The tube may be provided with a journal, channel, trough or other suitable recess, defining a keyway 18, or other suitable mating structure, for cooperation with a coupling or other suitable hardware, as will become apparent in the description that follows. The keyway 18 may extend that full length of the tube, or along a portion of the tube, or may terminate a predetermined distance from one or more ends of the tube. The exemplary side frame 10 has a side tube 12 with a keyway 18 extending axially along a side of the side tube 12 (shown in FIG. 1) and a keyway 18 extending axially along the back of the front tube 14 (shown in FIG. 2). It should be appreciated that, although a keyway 18 is shown along one radial surface of the tubes, a plurality of keyways may be spaced radially apart about the tubes and/or axially apart along the tubes.

Now with reference to FIG. 3, there is illustrated an enlarged sectional view of the side frame 10. The keyway 18 preferably has a concave or arcuate shape along the length of the keyway 18, as shown in cross-section in FIG. 3. About the keyway 18, bordering the radial outer surface of the keyway 18 (i.e., along each edge of the keyway 18) is a curved, rounded, blunt or soft corner 20, as opposed to a sharp corner, to provide a smooth transition about the keyway 18 adjacent the outer radial surface of the tube.

Indexable detents or dimples 22 are incrementally spaced axially apart within the keyway 18. The dimples 22 are preferably semi-spherical in shape. Each dimple 22 is provided with an opening for receiving a plunger, as will become more apparent in the description that follows. Each dimple 22, about its opening, is preferably bounded by a curved, rounded, blunt or soft corner 26 to provide a smooth transition between the opening and the keyway 18.

The soft corners 20 and 26 each provides a smooth transition for paint to easily flow in the keyway 18 and dimples 22 so that the tube may be easily painted, unlike a conventional squared-off keyway, which inhibits a consistent flow of paint in the keyway when painting the tube.

The keyway 18 is preferably formed in a secondary process after the formation of the tube. The tube is preferably stamped, embossed, rolled or similarly formed with the keyway 18 and dimples 22. Forming the keyway 18 and dimples 22 along the tube by stamping, embossing or rolling the tube after the tube is extruded or otherwise formed allows for greater flexibility in the manufacturing process. Additionally, forming the keyway 18 and dimples 22 along the tube by stamping, embossing or rolling the tube results in a hardened tube with a superior strength. Additionally, the arcuate shaped keyway 18 and semi-spherical dimples 22, together with the soft corners 20 and 26 increase the rigidity of the tube, unlike a conventional squared-off keyway, which weakens the structural integrity of the tube, subjecting the tube to the risk of fracture during the production process.

Although the keyway 18 is preferably formed after the formation of the tube, it should be appreciated that the tube could be extruded or otherwise formed with the keyway 18 therein. However, it is preferable that the dimples 22 are formed in a secondary process.

Figure 4:
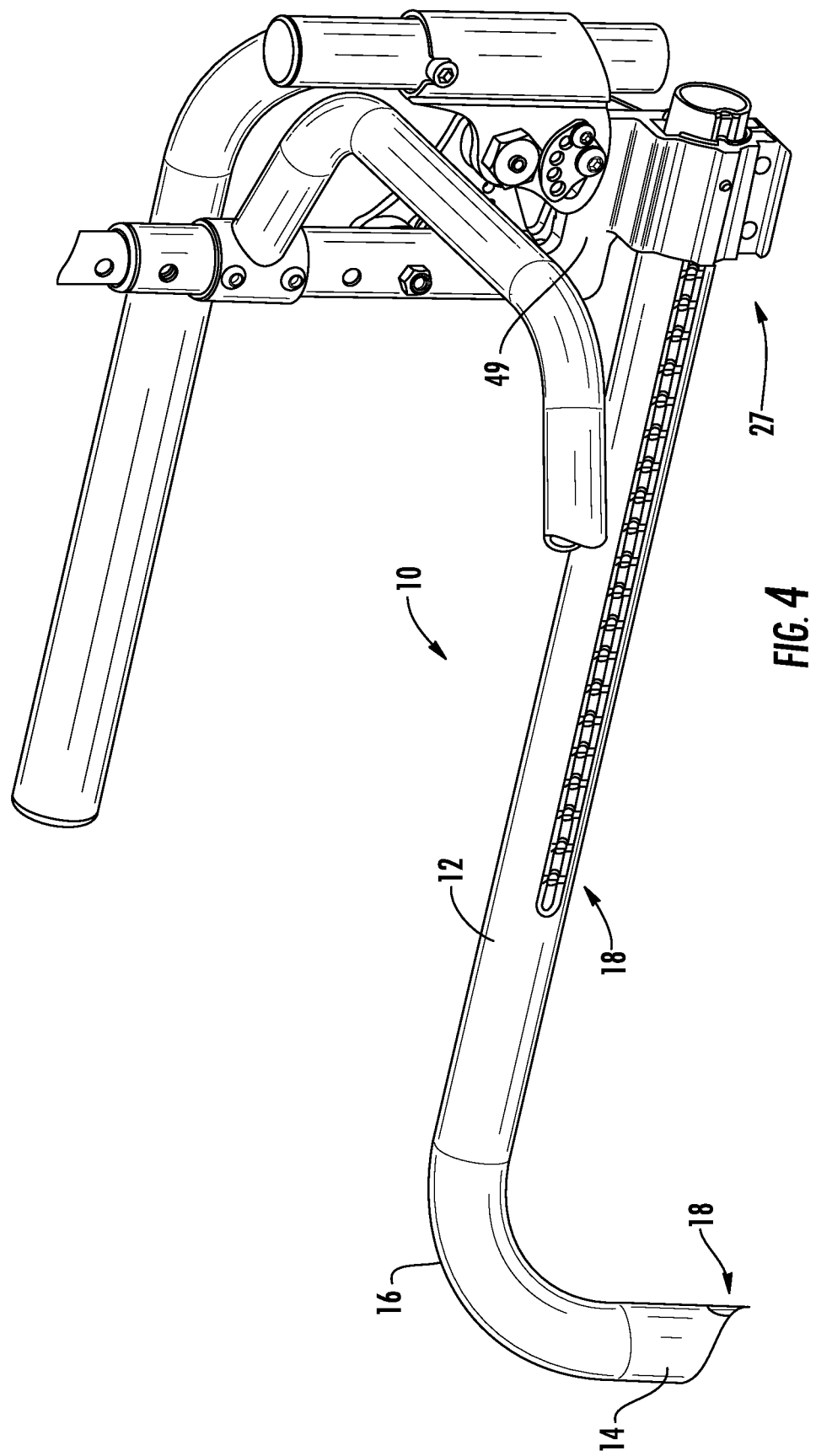
FIG. 4 is an enlarged perspective view of the side frame shown in FIG. 1 with exemplary component parts coupled at a first position in relation to the side frame.
Figure 5:
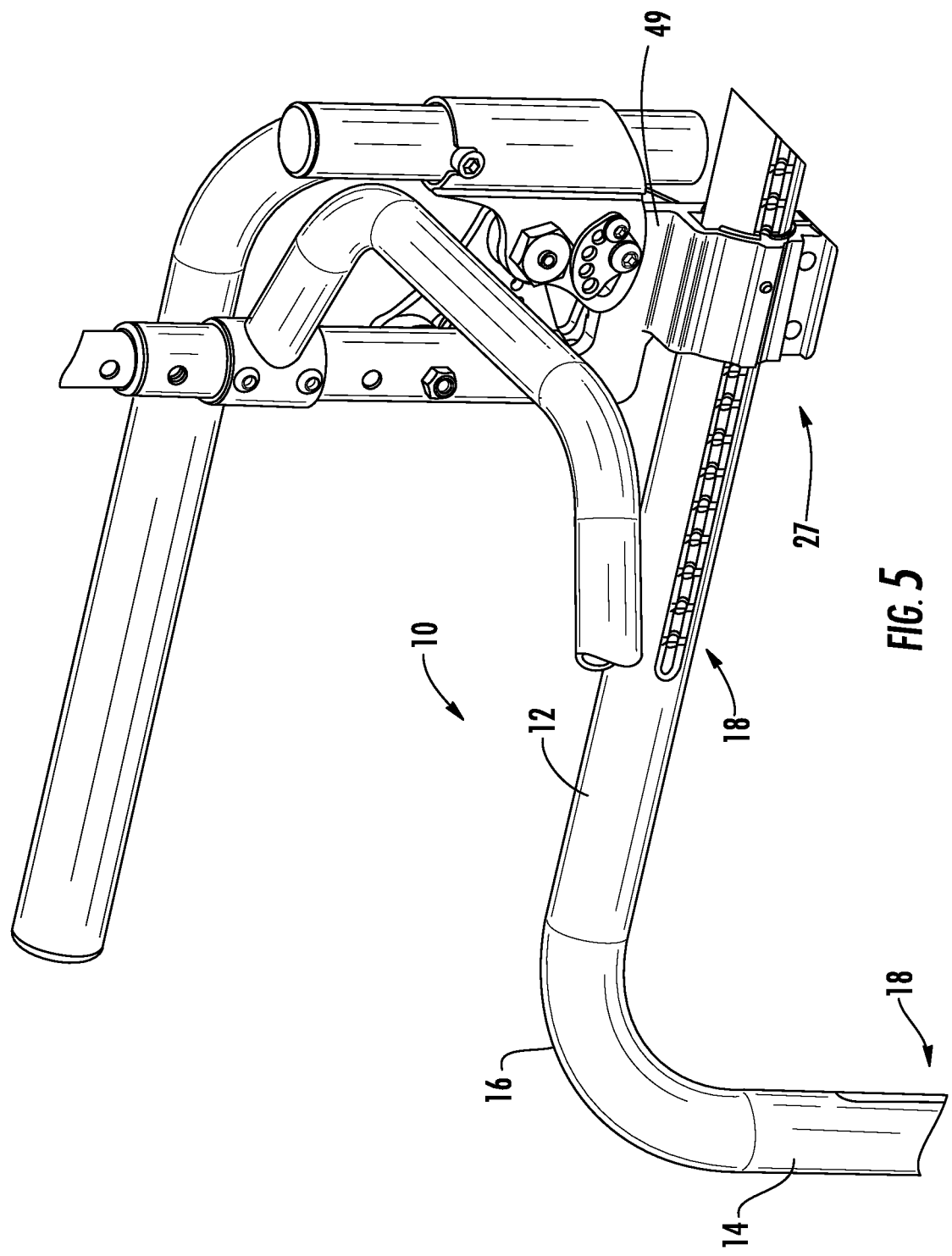
FIG. 5 is an enlarged perspective view of the side frame and component parts shown in FIG. 4 with the component parts coupled at a second position in relation to the side frame.

The keyway 18 is configured to cooperate with a coupling so as to prevent rotation of the coupling in relation to the tube. This permits component parts to be oriented in predetermined positions as desired along the tube, as illustrated, for example, in FIGS. 4 and 5. It should be appreciated that the keyway 18 and dimples 22 can be oriented along the tube at substantially any degree around the tube to allow for greater flexibility in positioning the coupling along the tube.

Figure 6:
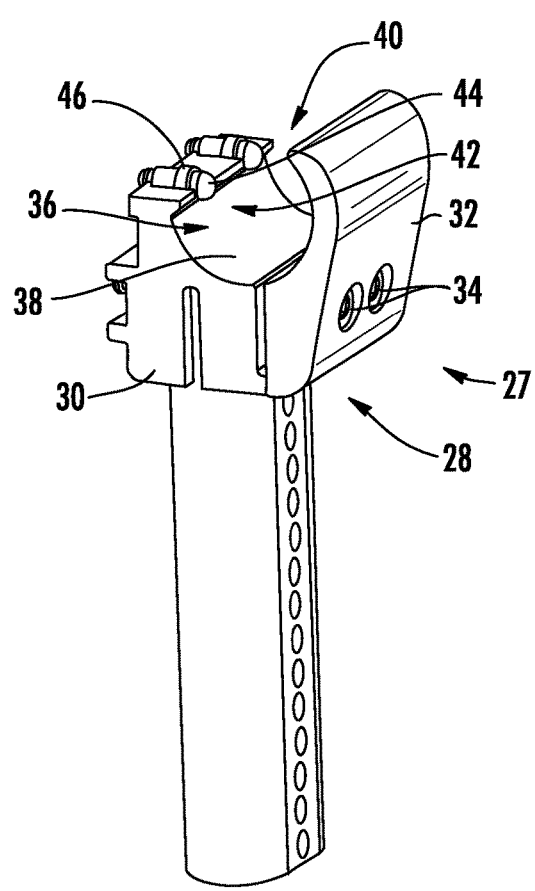
FIG. 6 is an enlarged, partially cutaway, environmental perspective view of a coupling for use with the side frame.
Figure 7:
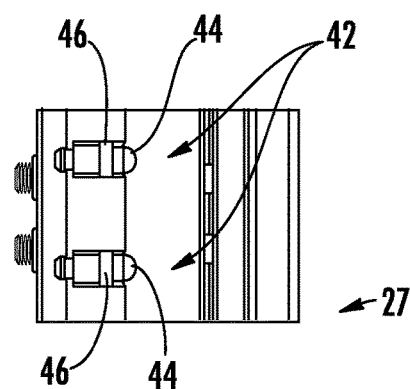
FIG. 7 is a cross-sectional view of the coupling show in FIG. 6.

An exemplary coupling 27 for use with the side frame 10 is shown in FIGS. 6 and 7. The exemplary coupling 27 includes a two-piece clamp 28, having a first piece 30 joined together with a second piece 32 by cap screws 34. In this illustrated embodiment, the first piece 30 may include female threaded bores (in the blind side of the clamp 28 when viewing FIG. 6). The second piece 32 includes through bores through which the cap screws 34 may pass and thread into the female threaded bores. The cap screws 34, when tightened, are recessed within countersink holes in the second piece 32. Tightening the two pieces 30 and 32 together form a clamp 28, which defines at least a partially cylindrical passage 36 (see the passage 36' in its entirety in FIG. 8) through which passes and at least partially encapsulates the tube described above.

The passage 36 is defined by an inner wall 38, formed by the cooperating pieces 30 and 32. Extending axially (i.e., parallel with the axis of the cylindrical passage 36) within the passage 36 is a convex, arcuate shaped key 40 that is dimensioned and configured to cooperate with the keyway 18 along the tube. One or more plungers 42 are preferably spaced apart axially along the key 40. Each plunger 42 preferably comprises an ultra-high-molecular-weight polyethylene face 44 that engages the tube, particularly the keyway 18 and selectively, the dimples 22. A urethane spring 46 (as shown in the cutaway view in FIG. 6) extends and retracts into and out of the dimples 22 as the clamp 28 slides along the tube. Hence, the face 44 of the plungers 42 functions like a spring ball. In the exemplary clamp 28, there are two plungers 42, which may be spaced 0.750 inches apart (see FIG. 7). The dimples 22 may be spaced 0.250 inches apart. This allows the plungers 42 to engage the dimples 22 every 0.250 inches. Of course, a single plunger 42 may be provided, and a plurality of plungers 42 may be spaced any suitable distance apart, and the dimples 22 may likewise be placed any suitable distance apart.

It should be understood that the coupling 27 may take on any suitable shape or configuration, as desired. For example, the coupling in FIGS. 4 and 5 includes a bracket or plate 49 that extends vertically upward for the attachment of various components, including but not limited to seatback tubes. Alternatively, the coupling may include a tube socket (e.g. in the blind bottom surface of the coupling 27 shown in FIG. 6) for receiving a tube. As yet another alternative, the coupling may include a bracket, plate or other suitable structure for engaging a cross tube, as will become apparent in the description that follows immediately below.

Figure 8:
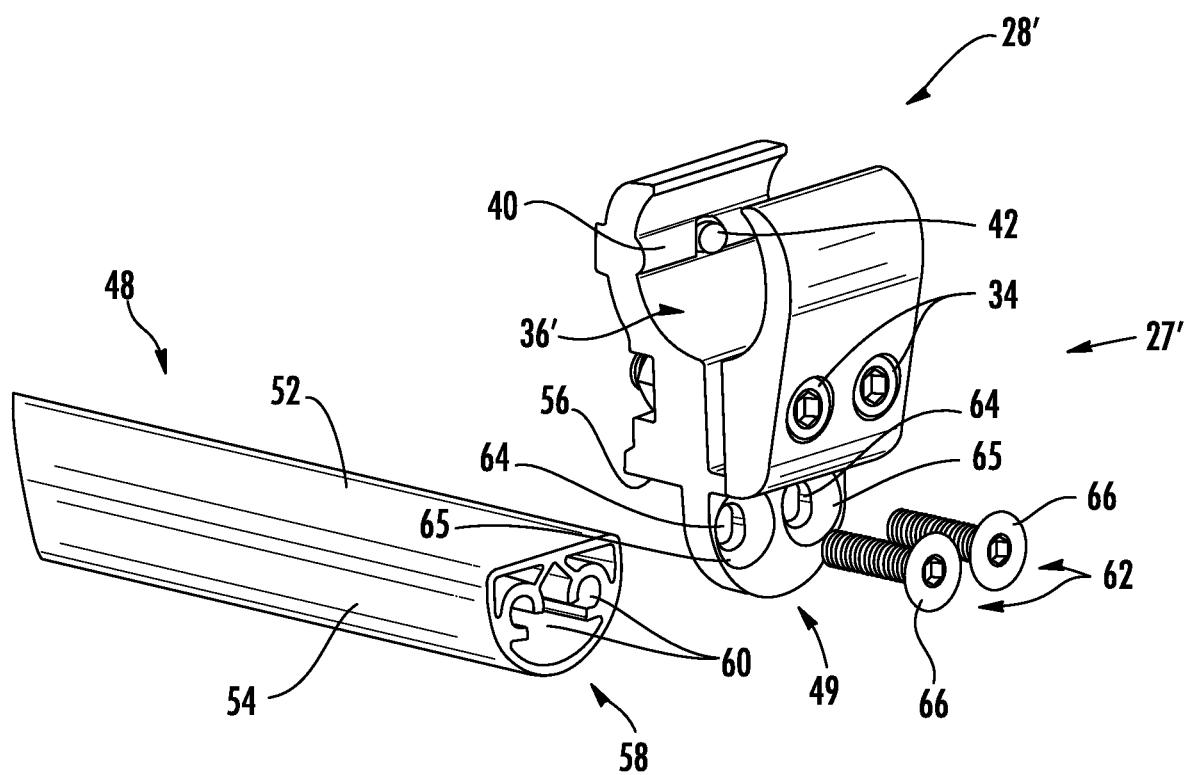
FIG. 8 is an enlarged environmental perspective view of a coupling for use with the side frame for coupling a cross tube in relation to the side frame.

Now with reference to FIG. 8, there is illustrated a coupling 27' for use with the side frame 10 for coupling a cross tube 48 in relation to the side frame 10. The coupling 27' includes a two-piece clamp 28', as described above. The clamp 28' defines a partially cylindrical passage 36' for receiving a tube. Extending axially within the passage 36' is a convex key 40 that is dimensioned and configured to cooperate with the keyway 18 (described above) along the tube to resist or prevent rotation of the clamp 28' in relation to the tube. One or more plungers 42 are provided along the key 40. The plungers 42 engage the tube (i.e., the keyway 18 and selectively, the dimples 22). The clamp 28' may be secured in a fixed position in relation to the tube by tightening the cap screws 34, thus forming a rigid connection between the tube and the clamp 28'.

Below the clamp 28' there is disposed a bracket or plate 49, or other suitable structure, for engaging a cross tube 48. The exemplary cross tube 48 preferably has a substantially flat upper surface 52 and a bottom surface 54, which is curved, rounded or semi-cylindrical so as to be aesthetically pleasing, although the tube may be of other suitable shapes. The cross tube 48 is preferably extruded. The tube, the coupling and the cross tube 48 may be formed of aluminum or other suitable rigid, lightweight materials.

The bottom of the clamp 28' has a flat surface 56 that is preferably at a right angle with a surface of the downwardly depending plate 49 so as to form a geometry that cooperates with the flat upper surface 52 and a flat end 58 of the cross tube 48. Within the end 58 of the cross tube 48 are two laterally spaced bores 60, which are threaded with a female thread (e.g., threaded after the cross tube 48 is cut to a desired length) for receiving tapered screws 62. The screws 62 pass through slots 64 in the plate 49 to thread into the threaded bores 60.

Figure 9:
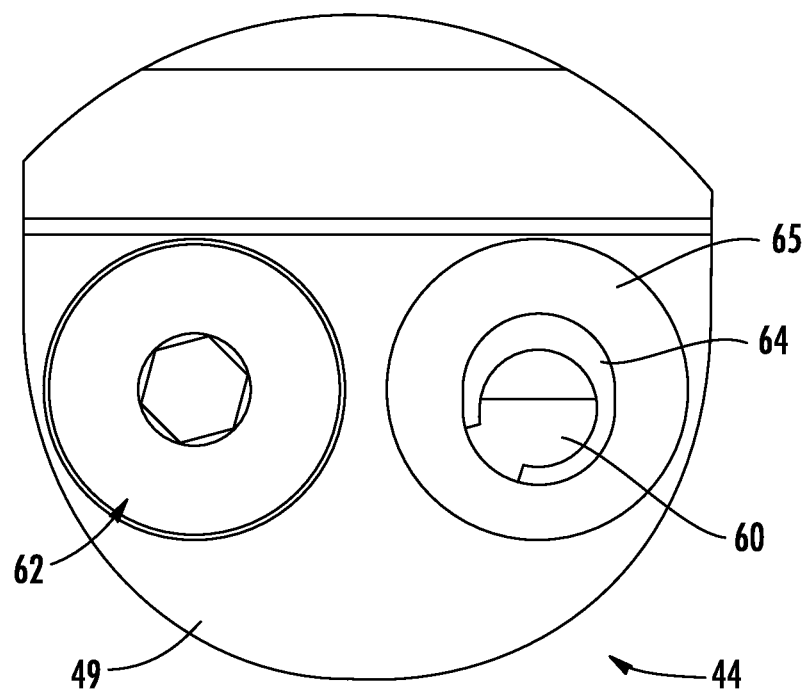
FIG. 9 is an enlarged environmental perspective view of a portion of the coupling shown in FIG. 8.

As illustrated in FIG. 9, the plate 49 is countersunk with a tapered surface 65, the center of which is offset from the center of the slots 64 (as illustrated by the solid and broken axes lines, respectively). When the screws 62 are initially threaded into the threaded bores 60, the plate 49 is held loosely in relation to the end 58 of the cross tube 48. As the screws 62 are tightened, the tapered heads 66 (as seen in FIG. 8) of the screws 62 cooperate with the tapered surfaces 65 to urge the cross tube 48 upward to tightly engage the flat upper surface 52 of the cross tube 48 with the flat bottom surface 56 of the clamp 28'. The cooperating tapered surfaces 65 and tapered heads 66 form a tapered lock that locks the coupling 27' and the cross tube 48 in two directions (i.e., horizontally and vertically) to produce a superior rigid connection between the coupling 27' and the cross tube 48, with no play or movement between the parts. This also effectively eliminates the risk that the screws 62 will become loose during the operation of the wheelchair. Additionally, because of the offset forces between the screws 62 and the tapered surfaces 65, the upward movement of the cross tube 48 compensates for any paint build up and any manufacturing tolerances that would arise in most conventional clamp-on or bolt-on cross tubes.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A wheelchair comprising:
a frame comprising at least one tube and an indexed structure comprising a concave keyway formed in the at least one tube and concave dimples formed within the keyway, the keyway extending in an axial direction along a side of the tube, and the dimples being incrementally spaced apart in the axial direction within the keyway; and
at least one coupling configured to selectively connect to the tube to allow adjustment in the coupling, the at least one coupling being configured to couple a wheelchair component in relation to the frame,
wherein the at least one coupling comprises a clamp comprising an at least partially cylindrical passage defining an inner wall that is configured to at least partially encapsulate the tube, and a keyed structure to cooperate with the indexed structure of the tube, the keyed structure comprising a convex key which protrudes radially from the inner wall and one or more spring-biased plungers disposed within the key that respectively mate with the keyway and dimples in the at least one tube, whereby the coupling is positionable at specific points in relation to the tube, wherein the one or more spring-biased plungers are spring loaded to extend from the key to selectively engage the dimples, and
wherein the clamp is tightened against the tube by manipulating at least one fastener so as to be prohibited from moving along the tube and such that the one or more spring-biased plungers securely engage the dimples, and wherein when loosened, the clamp is movable along the tube while the one or more spring-biased plungers selectively and discretely engage the dimples to provide an audible or tactile sensation indicative of an incremental movement of the coupling.

2. The wheelchair of claim 1, wherein the at least one tube comprises a side tube and a front tube joined to the side tube.

3. The wheelchair of claim 1, wherein the keyway has a boundary and each of the dimples has an opening having a boundary, and wherein the boundaries are defined by a soft corner to form a smooth transition between respectively the keyway and the key and the one or more plungers and the dimples.

4. The wheelchair of claim 1, wherein the dimples are semi-spherical in shape.

5. The wheelchair of claim 1, wherein the dimples are spaced 0.250 inches apart to allow the one or more plungers to engage the dimples every 0.250 inches.

6. The wheelchair of claim 1, wherein the at least one coupling is dimensioned and configured to cooperate with the tube so that rotation of the coupling in relation to the tube is prevented, while the coupling is positionable at predetermined positions along the tube.

7. The wheelchair of claim 1, wherein the at least one tube is a substantially cylindrical tube.

8. The wheelchair of claim 7, wherein the at least one coupling is formed of at least two parts, wherein the at least two parts are joined together by fasteners to clamp the at least one coupling against the tube.

9. The wheelchair of claim 1, wherein the at least one coupling forms a part of a system of couplings.

10. The wheelchair of claim 1, further comprising a bracket depending from the at least one coupling, wherein the bracket is dimensioned and configured to support one or more wheelchair components.

11. The wheelchair of claim 1, further comprising a tube socket supported in relation to the coupling, wherein the tube socket is dimensioned and configured to support a wheelchair tube.

12. The wheelchair of claim 1, further comprising a cross tube, wherein the at least one tube is one of a pair of laterally spaced side frame tubes, and the at least one coupling is one of at least a pair of couplings configured to selectively and operably connect to a respective one of the tubes to couple the cross tube to the side frame tubes.

13. The wheelchair of claim 12, wherein each coupling has a first surface and a second surface which cooperatively form an angular geometry that cooperates with respective surfaces of the cross tube, the second surface being defined by a plate, the cross tube having two spaced apart bores that are threaded with a female thread for receiving tapered screws that pass through slots in the plate to thread into the threaded bores, the plate being countersunk with a tapered surface that is centered at a point that is offset from a center of the slots so that tapered heads of the screws when tightened cooperate with the tapered surfaces to urge the cross tube to tightly engage a respective one of the respective surfaces of the cross tube with the first and second surfaces of the coupling.

14. The wheelchair of claim 1, further comprising:
a side tube;
a cross tube having a first surface and a second surface that is at an angle relative to the first surface, the tube further having spaced threaded bores therein; and
a taper lock system comprising:
a plate depending from the at least one coupling, the coupling defining a first surface and the plate defining a second surface that is at an angle relative to the first surface defined by the coupling, the plate comprising spaced slots each having a center, the plate being countersunk with spaced tapered bores each having a tapered surface having a center that is offset from the center of a respective one of the slots so that upon tightening screws into the threaded bores, tapered heads of the screws cooperate with the tapered surfaces to urge the cross tube upward to tightly engage the first surface of the cross tube with first surface of the coupling.

15. The wheelchair of claim 14, wherein the first surface of the cross tube is an upper surface of the cross tube and the second surface of the cross tube is an end of the tube.

16. The wheelchair of claim 14, wherein the angle is substantially a right angle.

* * * * *